United States Patent [19]
McRowe

[11] 3,886,262
[45] May 27, 1975

[54] POTASSIUM ZINC CUPROCYANIDE

[75] Inventor: Arthur W. McRowe, Akron, Ohio

[73] Assignee: The B. F. Goodrich Company, Akron, Ohio

[22] Filed: Apr. 4, 1974

[21] Appl. No.: 457,925

Related U.S. Application Data

[62] Division of Ser. No. 407,863, Oct. 19, 1973.

[52] U.S. Cl. .............................. 423/364; 423/468
[51] Int. Cl. .............................................. C01c 3/08
[58] Field of Search ............................. 423/29–31, 423/364, 368, 370; 75/105; 204/91, 52 Y, 55 Y

[56] References Cited
UNITED STATES PATENTS

| | | | |
|---|---|---|---|
| 2,677,653 | 5/1954 | Chester et al. .................. | 423/364 X |
| 3,242,090 | 3/1966 | Grunwald ........................ | 75/105 X |

Primary Examiner—Earl C. Thomas
Attorney, Agent, or Firm—J. Hughes Powell, Jr.

[57] ABSTRACT

A new compound potassium zinc cuprocyanide has superior properties as a fire and smoke retardant in vinyl chloride polymers and provides non-discoloring formulations when tin mercaptide stabilizers are used.

1 Claim, No Drawings

POTASSIUM ZINC CUPROCYANIDE

This is a division of application Ser. No. 407,863, filed Oct. 19, 1973.

BACKGROUND OF THE INVENTION

Improving the fire resistance and retarding smoke formation of polymers is highly desirable, particularly in polymeric materials used in applications in upholstery, rugs, furniture, structural materials in homes and other buildings and in automobiles, busses, planes, trains, ships and the like. While vinyl chloride polymers have resistance to flame, improvement of this property and reduction of smoke formation is desirable for safety and health reasons.

SUMMARY OF THE INVENTION

A new compound, potassium zinc cuprocyanide, $KZnCu(CN)_4$, is readily prepared which has superior properties as a fire and smoke retardant in vinyl chloride polymers.

DETAILED DESCRIPTION

Potassium zinc cuprocyanide is readily prepared for example by dissolving cuprous cyanide in water containing three molar equivalents of potassium cyanide. To this clear solution there is added one molar equivalent of zinc acetate in water. A white precipitate immediately forms which is filtered, washed and dried.

Powder X-ray defraction of the dried powdered material shows it to be a highly crystalline compound and not a mixture of $KCN + Zn(CN)_2 + CuCN$, $KCu(CN)_2 + Zn(CN)_2$, $K_aZn(CN)_b + CuCN$ or any other mixture. Zinc cyanide, potassium zinc cyanide complexes and potassium cyanide complexes are water soluble. This new compound is water insoluble. Zinc cyanide and potassium zinc cyanide complexes decompose in hydrochloric acid. This compound is insoluble in and inert to hot concentrated hydrochloric acid. Analysis by X-ray fluorescence shows 14% potassium and equal amounts of copper and zinc.

This new compound is particularly useful as a fire and smoke retardant in vinyl chloride polymers in amounts from about 0.1 to 10 weight parts per 100 weight parts of vinyl chloride polymer added normally as a fine powder. Such vinyl chloride polymers are normally high molecular weight materials having a specific viscosity above 0.4 measured as a 0.4% solution in nitrobenzene include those vinyl chloride polymers well known to those skilled in the art as polyvinyl chloride as well as those containing vinyl chloride and up to about 50% by weight of other vinylidene monomers containing at least one terminal $CH_2=C<$ group, such as vinylidene chloride, alkyl acrylates and methacrylates wherein the alkyl group contains 1 to 10 carbon atoms, alpha-olefins containing 2 to 6 carbon atoms such as ethylene and propylene, vinyl esters such as vinyl acetate and vinyl butyrate, vinyl alkyl ethers, vinyl ketones, the styrenes, acrylonitrile, methacrylonitrile, lower dialkyl esters of maleic and fumaric acid as the diethyl and dimethyl esters, and the like, chlorinated vinyl chloride polymers and blends of vinyl chloride polymers with other polymers, both plastics and elastomers as is well known to those skilled in the art.

The vinyl chloride polymers will be mixed in addition to the $KZnCu(CN)_4$ with standard compound ingredients known to those skilled in the art, plasticizers, lubricants, stabilizers, fillers, colorants, processing aids and the like by known methods.

EXAMPLE I 5.0 grams of cuprous cyanide was dissolved in 120 ml. water containing 11.58 grams of potassium cyanide. To this clear solution there are added 12.25 grams of zinc acetate in 50 ml of water. A white precipitate immediately formed which was filtered, washed and vacuum dried for 20 hours at 60°C. The yield of 13.8 grams of $KZnCu(CN)_4$ was 89+% of theoretical. The powder X-ray defraction showed a crystalline compound. The compound was insoluble in water and inert to hot concentrated hydrochloric acid. Analysis by X-ray fluorescence showed 14% potassium and equal amounts of copper and zinc.

EXAMPLE II

To demonstrate the fire and smoke retardant properties of this compound, the following formulation was prepared by powder blending: 100 parts by weight of polyvinyl chloride (Geon 103EP), 2 parts by weight of dibutyltindithioglycolate stabilizer and 3 parts by weight of polyethylene having specific gravity of 0.924g/cc and melt index of 5 g/10 minutes with 0, 0.5 and 5.0 parts by weight of the potassium zinc cuprocyanide.

The preblended mixtures were milled on a 2 roll mill at 330°F. for 3 minutes after banding. The samples were sheeted off the mill to 78 mil thickness and were press molded at 350°F. for 5 minutes and cooled under pressure to give white sheets $6 \times 6 \times 0.075$ inch in size. There was no brown discoloration of the sample that normally is obtained when both a copper compound and the tin mercaptide stabilizer are present in polyvinyl chloride. $6 \times \frac{1}{4} \times 0.075$ inch test specimens were cut for smoke-oxygen index measurements.

The smoke-oxygen index measures the mass loss rate, which is related to the burning rate, and a smoke rate determined by the ratio of rate of smoke production measured by optical density to the mass loss rate. The smoke-oxygen index is the Oxygen Index ASTM D-2863 test method modified by means of the apparatus described by Dipietro et al., Journal of Fire and Flammability, Volume 2, Page 36, 1971. The following results were obtained.

| Sample | Oxygen Index | Smoke Rating | % Smoke of Control |
|---|---|---|---|
| Control | 44.0 | 450 | 100 |
| 0.5 $KZnCu(CN)_4$ | 50.4 | 206 | 45.8 |
| 5.0 $KZnCu(CN)_4$ | 54.6 | 184 | 40.9 |

This clearly demonstrates the utility of this novel compound as an effective fire and smoke retardant in vinyl chloride polymers. Further unexpected advantages are the ease with which this compound is incorporated into vinyl chloride polymer formulations with minimum effect on desirable physical properties. It is of particular utility and value that this compound does not react with the tin mercaptide stabilizer which has great utility in vinyl chloride polymers. Many other fire and smoke retarders do react with tin mercaptide and discolor the vinyl chloride polymer compositions.

I claim

1. Potassium zinc cuprocyanide of the formula $KZnCu(CN)_4$.

* * * * *